United States Patent
Brunn et al.

(10) Patent No.: US 10,348,669 B2
(45) Date of Patent: Jul. 9, 2019

(54) ENCOURAGING THE ENGAGEMENT OF USERS ON A SOCIAL NETWORK SITE

(71) Applicant: International Business Machines Corporation, Armonk, NY (US)

(72) Inventors: Jonathan F. Brunn, Logan, UT (US); Jeffrey R. Hoy, Gibsonia, PA (US); Marit L. Imsdahl, Cary, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 14/947,794

(22) Filed: Nov. 20, 2015

(65) Prior Publication Data
US 2017/0149721 A1 May 25, 2017

(51) Int. Cl.
*H04W 4/21* (2018.01)
*H04L 12/58* (2006.01)
*H04L 29/08* (2006.01)

(52) U.S. Cl.
CPC ............. *H04L 51/32* (2013.01); *H04L 51/16* (2013.01); *H04L 51/22* (2013.01); *H04L 51/24* (2013.01); *H04L 67/22* (2013.01); *H04L 67/306* (2013.01); *H04W 4/21* (2018.02)

(58) Field of Classification Search
CPC .... G06Q 50/01; G06Q 30/0224; H04L 51/32; H04L 67/22
See application file for complete search history.

(56) References Cited

U.S. PATENT DOCUMENTS

| | | | |
|---|---|---|---|
| 6,742,032 B1 * | 5/2004 | Castellani | G06Q 30/02 709/205 |
| 7,069,308 B2 | 6/2006 | Abrams | |
| 8,388,446 B1 * | 3/2013 | Craine | A63F 13/48 463/42 |
| 8,449,396 B2 * | 5/2013 | Craine | A63F 13/48 463/42 |
| 8,539,030 B2 * | 9/2013 | Wang Baldonado | G06Q 10/107 709/206 |
| 8,856,141 B1 | 10/2014 | Dean et al. | |
| 8,903,909 B1 | 12/2014 | Marra et al. | |
| 8,943,136 B2 | 1/2015 | Faller et al. | |

(Continued)

OTHER PUBLICATIONS

Office Action dated May 17, 2018 received in U.S. Appl. No. 14/947,868, 22 pages.

(Continued)

*Primary Examiner* — Edward Kim
(74) *Attorney, Agent, or Firm* — Scully, Scott, Murphy & Presser, P.C.; L. Jeffrey Kelly, Esq.

(57) ABSTRACT

Increasing social network site interactions or user activities in one aspect may include monitoring social network site activities of a first user on a social network site. Based on the monitoring, a second user of the social network site whose postings the first user follows may be identified. The second user's postings that the first user follows may be classified into a content type. The content type indexed by a pair of identifiers identifying the first user and the second user may be stored in a storage device. A notification may be sent to the second user to post content of the content type to promote social network site interactions or activities of the first user.

20 Claims, 3 Drawing Sheets

(56) References Cited

U.S. PATENT DOCUMENTS

| | | | |
|---|---|---|---|
| 2005/0021750 A1* | 1/2005 | Abrams | G06Q 10/10 709/225 |
| 2007/0168446 A1 | 7/2007 | Keohane et al. | |
| 2009/0177744 A1* | 7/2009 | Marlow | G06Q 10/10 709/204 |
| 2010/0174747 A1 | 7/2010 | Farrell et al. | |
| 2010/0332330 A1 | 12/2010 | Goel et al. | |
| 2011/0196922 A1 | 8/2011 | Marcucci et al. | |
| 2011/0246907 A1* | 10/2011 | Wang | G06Q 30/0224 715/751 |
| 2011/0258055 A1 | 10/2011 | Abbott | |
| 2011/0320533 A1* | 12/2011 | Belinsky | G06F 16/958 709/203 |
| 2012/0054277 A1* | 3/2012 | Gedikian | G06Q 10/10 709/204 |
| 2012/0102114 A1* | 4/2012 | Dunn | G06Q 10/10 709/204 |
| 2012/0136929 A1 | 5/2012 | Li et al. | |
| 2012/0158843 A1* | 6/2012 | Angani | G06Q 30/02 709/204 |
| 2012/0203846 A1 | 8/2012 | Hull et al. | |
| 2012/0226544 A1 | 9/2012 | Merrifield | |
| 2013/0030905 A1 | 1/2013 | Fuloria et al. | |
| 2013/0054714 A1* | 2/2013 | Bedi | G06Q 10/10 709/206 |
| 2013/0061296 A1 | 3/2013 | Reddy et al. | |
| 2013/0159110 A1 | 6/2013 | Rajaram et al. | |
| 2013/0268591 A1* | 10/2013 | Chen | G06Q 50/01 709/204 |
| 2013/0304822 A1* | 11/2013 | Tetreault | H04N 21/2187 709/204 |
| 2013/0325948 A1* | 12/2013 | Chen | G06Q 50/01 709/204 |
| 2014/0129627 A1* | 5/2014 | Baldwin | H04L 67/306 709/204 |
| 2014/0189013 A1 | 7/2014 | Abhyanker | |
| 2014/0278852 A1 | 9/2014 | Kulish | |
| 2016/0182434 A1* | 6/2016 | Systrom | H04L 51/32 709/206 |

OTHER PUBLICATIONS

Office Action dated Dec. 31, 2018 received in U.S. Appl. No. 14/947,868, 16 pages.

Notice of Allowance dated May 7, 2019 received in U.S. Appl. No. 14/947,868, 13 pages.

* cited by examiner

ENCOURAGING THE ENGAGEMENT OF USERS ON A SOCIAL NETWORK SITE

FIELD

The present application relates generally to computers and computer applications, and more particularly to a computer-implemented system and method that encourage the engagement of users on a social network site.

BACKGROUND

A social network service or site provides a computer-implemented platform that builds social networks or social relations among users. For example, a social network site allows a user to connect to others who may share interests, and for example, form a group or network of connections with others. A social network service may includes a user profile that represents the user, the user's social links (e.g., friends), and other services. Social network sites may be web-based services that allow individuals to communicate with one another over the Internet or like communications network.

Social network services or sites provide notifications from close friends and/or family, indication of approval, e.g., the count of "likes" of the user's posts, and comments on the user's posts. While those techniques may maintain a user's interest and activity, if a user drops the user's interest, shown by lack of user's on-line activity on the social network site, there exists no clear solution that identifies how to engage and revitalize the particular user's interests, especially if the user's interest was based on another user's posts, comments, and/or articles.

BRIEF SUMMARY

A system and method of increasing social network site interactions may be provided. The method, in one aspect, may include monitoring social network site activities of a first user on a social network site. The method may also include, based on the monitoring, identifying a second user of the social network site whose postings the first user follows. The method may also include classifying the second user's postings that the first user follows into a content type. The method may also include storing in a storage device, the content type indexed by a pair of identifiers identifying the first user and the second user. The method may also include sending a notification to the second user to post content of the content type to promote social network site interactions of the first user.

A system of increasing social network site interactions, in one aspect, may include one or more hardware processors operable to monitor social network site activities of a first user on a social network site. One or more of the hardware processors may be further operable to identify a second user of the social network site whose postings the first user follows. One or more of the hardware processors may be further operable to classify the second user's postings that the first user follows into a content type. A storage device may be couple to one or more of the hardware processors. One or more of the hardware processors may be further operable to store in the storage device, the content type indexed by a pair of identifiers identifying the first user and the second user. One or more of the hardware processors may be further operable to send a notification to the second user via a communication network requesting the second user to post content of the content type to promote social network site interactions of the first user.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A method, system and techniques may be provided that in one embodiment proactively keeps users engaged in a social network service or site. A web site implementing a service may send electronic mails (emails) or text messages (e.g., Short Message Service (SMS) messages) to users of the service responsive to detecting that the users have not been active and asking them to re-engage with the service. These messages may also include special promotions or coupons, for example, if the web site is a commerce site. For content sites, the messages may include summaries of news or recent content or other content that the user may have read or viewed when the user visited the site. For social network sites, the messages may include summaries of activity in a social network.

For instance, when a moderator of a group or page in a social network site has not posted content for some time, the social network site may send an email with recent activity in the group, tips for engaging users in that group, and suggestions on articles and/or comments to post. To date, the sites that try to get a user to re-engage focus on communicating with that user who has disengaged and trying to get their attention or interest. Focusing on the particular user only may not address the root causes for a user's disengagement. If the user has disengaged due to a lack of relevant information and stories from the user's network, sending such messages or emails may not help in trying to re-engage the user and instead may further prompt user actions such as changing email settings to not receive such notifications or by terminating the user's account.

To proactively re-engage a user of a social network service, a method and/or system of the present disclosure in one embodiment may detect one or more behaviors which influence the engagement of other users, detect changes in a user's behavior which changes the behavior of the user's followers, and influence users to post items which is determined to solicit engagement from the user's network.

In one embodiment, a method and/or system of the present disclosure may encourage a user, a followed user, to continue and prioritize activity that maintains other user's interests. Briefly, a follower in social network setting subscribes online to a followed user's posts or like and receives that user's posts, for example, via a communication network, for example, on the follower's device. For the followers, the social network can indicate to the followed user which posts, topics and articles were of interest that encouraged and maintained the followers' activity and interest on the social network site. In this case, the followed user is notified that the followed user's behavior, the lack or change of activity, has affected the followers' activity. The followed user is also encouraged to post messages which affect the engagement of other users.

For example, consider a user, User T, who joined a social network to follow a local town official, User M, who posts updates on town politics. At some future point, User M no longer posts on such topics and the system correlates a drop in User T's activity on the social network over a period of time. These conditions are an indication that the 'followed' user's behavior (User M's behavior) has negatively affected the interest and activity of the 'follower' (User T) and their use of the social network. The conditions trigger a notification to the 'followed' user that a particular topic and/or post has maintained interest for x users, encouraging the 'followed' user with this motivational statistic to start posting and maintaining activity as before. The 'followed' user's news stream (User M's stream) is also modified to show more targeted posts (which may include advertisements or sponsored posts or regular posts from the users' network) of a type which would gather User T's attention. In this way, the system adjusts the display to User M based on not only User M's personal engagement with topics, but second order engagement which is dependent on her engagement.

The method and/or system of the present disclosure in one embodiment thus may assess User B's interest of User A's activity, may assess that User B's decline of activity is dependent upon User A's change of behavior, and encourages User A to resume the activity determined to be of interest to User B to maintain User B's interest.

The following describe example use cases in one embodiment of the present disclosure. User J shares an article from XYZ Corporation about Topic X on a social network site. User M follows User's J's XYZ Corporation articles and usually approves the articles by indicating 'likes' of the articles on the social network site. Over time, User J no longer posts XYZ Corporation articles. At the same or substantially the same time, the method and/or system of the present disclosure detects a drop in User M's activity on the social network site. The method and/or system assesses that User J's activity of posting XYZ Corporation articles maintained User M's interest. In response, the method and/or system may send a notification User J to post XYZ Corporation articles to resume, notifying User J that User M's interest depends on User J's posts. Such notification may be accompanied by a similar article or link to a similar article. For instance, the method and/or system of the present disclosure may post on User J's page the following message: "User J, we have noticed a decline in XYZ Corporation articles you have posted in the last weeks. Here is an interesting article about XYZ Corporation's deal with ABC Corporation you may be interested in posting: <article content or link>".

As another example, a method and/or system of the present disclosure in one embodiment may recognize that User J's posts of family photos have maintained another user's interest and activity on a social network. If User J stops posting family photos and as a result the other user disengages from the social network, the method and/or system may encourage User J to post more family photos. Encouragement may be performed, for example, by sending an electronic notification to User J, a message on User J's social network page, and/or others.

Figure 1:
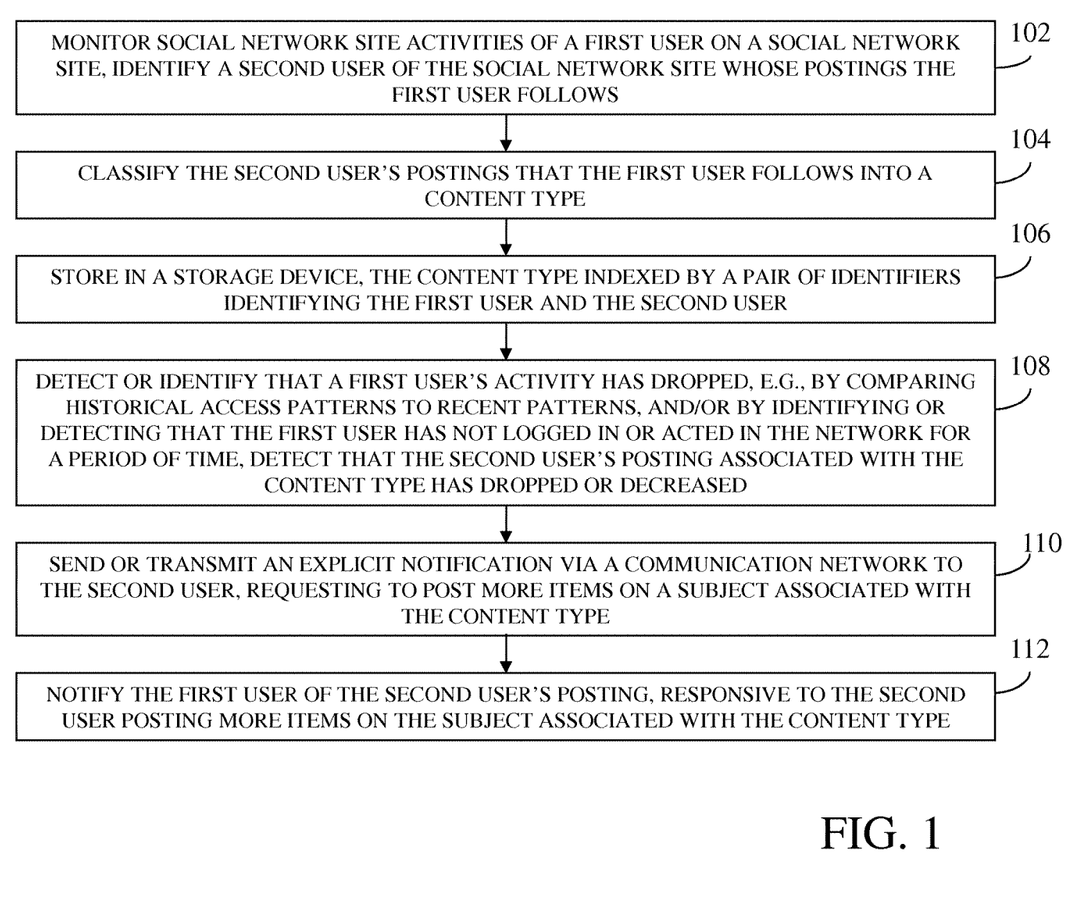
FIG. 1 is a flow diagram illustrating a method of increasing social network site interactions in one embodiment of the present disclosure.

FIG. 1 is a flow diagram illustrating a method of engaging users on a social network site in one embodiment. For instance, the method may increase social network site interactions. The method, for example, identifies content type posted by a user that is of interest to others and notifies the user about the interest of others. The method may be implemented, coupled to, or integrated with a social network server or application, and performed or executed by one or more hardware processors, computer processors, microprocessors or another hardware component. The method, for example, may be performed for each of a plurality of users of a social network site or service.

At 102, a user's social network site activities may be monitored, and for a user (e.g., user A, also referred to as a first user for sake of explanation) of a social network site or service, a hardware processor, e.g., a social network server, may keep track of, or identify, other users (e.g., user B, referred to as one or more second users for sake of explanation) from whose content the user (e.g., user A) reposts, likes, shares and reads. For example, user B is a followed user and user A is a following user or follower who follows user B's posts.

At 104, from among the stories or content acted on or viewed by the user (e.g., user A) from a particular user B, a hardware processor may find types and classifications of content which are most common (for instance, "news about XYZ Corporation" may be one classification). One or more types and/or classifications may be identified for each user B. So for instance, for each user A/user B pair, one or more types or classification may be identified. For example, user A follows a particular user B's posts on topic Z; user A follows another particular user B's posts on topic Y. Any number of prior well-known methods may be used to classify stories and content.

At 106, a hardware processor may store these classifications in a data store or database indexed by a pair of identifiers (IDs) of user A and user B. As an example, user A's activity may be mostly about one topic, Topic Z (e.g., sports) taken in aggregate, but user A may be most interested in another topic, Topic Y (e.g., business information) from a particular user B. Hence, in one embodiment, a hardware processor may perform an analysis and store information for each ordered pair of user A and user B identified at 102.

At 108, a hardware processor may detect or identify that a user A's activity has dropped, e.g., by comparing historical access patterns to recent patterns, and/or by identifying or detecting that user A has not logged in or acted in the network for a period of time. The period of time may be measured based on a threshold value or a predetermined period of time. Similarly, whether the recent access patterns is less than the historical access patterns may be determined based on a threshold value of accesses, e.g., 50% less. The threshold values for comparison may be configurable. A hardware processor may also detect that the second user's posting associated with the content type has dropped or decreased.

At 110, for each user B identified at 102, a hardware processor may encourage posts of the type identified for the user A/user B pair stored at 106. Examples of encouragement may include, but are not limited to, showing more content and/or posts to user B of a type or a classification identified at 104, sending or transmitting an explicit notification via a communication network to user B, requesting user B to post more items on a subject, and the notification may also include specific items for posting. For instance, these explicit notifications may include suggested content or posts to reshare, which may be selected from among all posts to the social network or from among all posts to the direct network of user B that match a classification identified at 104.

At 112, responsive to a user B, a set of user B's, or any users from user A's network have acted on a story or content matching classifications identified at 104, a hardware processor may notify user A that there is new content which may interest user A from user A's network, e.g., through one or more communication channels, e.g., electronic mail (email) and/or directed mobile notifications such as short message service (SMS) or another form of automatic notification to user A's device.

In one aspect, a hardware processor may encourage users regardless of whether there is a drop in activity on the social network site. For instance, a hardware processor may predict based on other users' behavior that a user may drop in activity, for example, if the hardware processor detects that the posting on a topic or content of user's original interest of joining is declining and/or the user's activity levels are starting to drop. In such instances, a hardware processor may proactively encourage behavior to maintain the interest.

In another aspect, if the user activity (of a following user) is dropping but the other user (followed user) is already posting a high level of interesting content (determined to be the reason the following user joined), those factors can be ruled out, and the method and/or system may look for other potential factors that would re-engage the absent or potentially absent user (following user).

A method and/or system of the present disclosure, for example, as described above, in one embodiment proactively engages a followed user (e.g., referred to as one or more second users) to continue and prioritize activities that maintain a following user's (e.g., referred to as a first user) interests in a social media for example, posted on a social network or media site.

The method and/or system of the present disclosure in one embodiment may also identify and notify a lack of and/or change in an activity associated with content type posts of a user who is followed by other users (followers).

In one embodiment, the user who is followed by others (referred to above as a second user or user B) is considered as an anchor user. In one embodiment of the present disclosure, the method and/or system alters the behavior of the anchor user to keep other users (referred to above as user A or a first user) interested. In one aspect, there is no need to predict the actual cause of the user's disengagement, for example, decrease in social network site activities of user A's or followers. The method and/or system of the present disclosure in one embodiment may increase the presence of content and notifications which the user (follower) interacted with while the user (follower) was active on the social network site, and to increase such content and notifications which recently decreased. If the user (follower) previously interacted heavily with content of a given type or classification, the presence of more of this type of content (e.g., if it had recently decreased) may increase the likelihood of a user's engagement with the social network service.

The method and/or system of the present disclosure may request an anchor user to take the actions determined to be helpful for increasing user activities on the social network site, for example, by sending a targeted notification to the anchor user (followed user), for example, sending content such as advertisements and/or altering the content of a user's stream. The method and/or system of the present disclosure in one embodiment may provide targeted notifications with a dedicated rendering so the user receiving the notification understands the special purpose of the notification. For instance, the anchor user may want to understand the fact that the notification was not derived from the normal targeting for the anchor user but is a special notification intended to help other users in their network.

Figure 2:
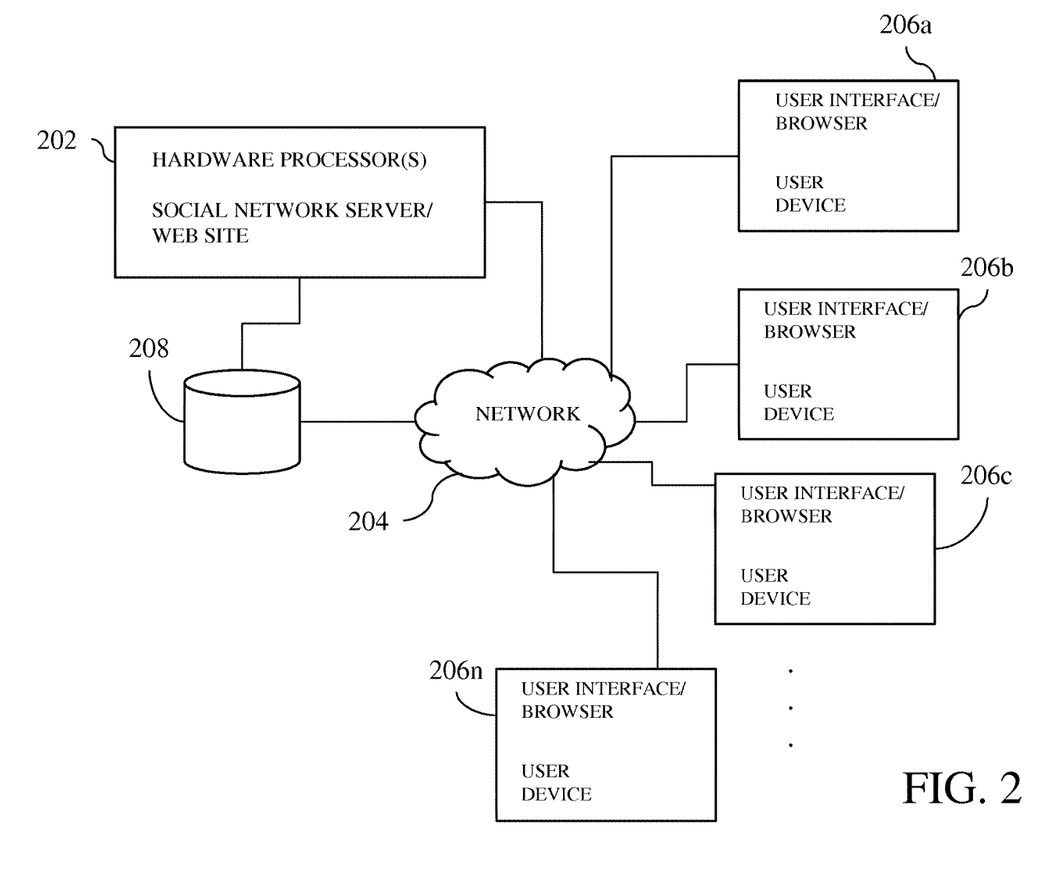
FIG. 2 is a diagram illustrating components of a system for increasing social network site interactions or activities in one embodiment of the present disclosure.

FIG. 2 is a diagram illustrating components of a system for engaging users on a social network site in one embodiment of the present disclosure. The system, for example, may identify content type posted by a followed user of interest to others (followers) and notify the followed user about the interest based on one or more criteria. One or more hardware processors 202 may run a social network application and/or function as a social network server, for example, that provide a social network web site to which one or more users of the social network may connect and interact with one or more other users, for example, via the user devices (e.g., 206a, 206b, 206c, . . . 206n) over a communication network, 204. The one or more user devices (e.g., 206a, 206b, 206c, . . . , 206n) may run or execute a user interface such as a web browser that allows a user to interact with the social network server or web site 202. A user, for example, may post content on the social network, via the user interface on the user device. A user, for example, may access, view or otherwise read content posted by another user on the social network, via the user interface on the user device.

The social network server 202 may monitor content posted from a user (e.g., 206a) to other users (e.g., one or more of 206b, 206c, . . . , 206n) in a social networking system. The social network server 202 may analyze access to the content by the other users to determine a content type interest of the other users and a frequency of access of the other users. Based on the analysis, the social network server 202 may form a history of frequency of access or pattern of access by user to content type. The social network server 202 may notify the user (e.g., 206a) to continue posting content having the content type interest. The social network server 202 may identify a summarization of interest and access of other users (e.g., one or more of 206b, 206c, . . . , 206n) interested in the content type. In one embodiment, the social network server 202 may notify the user (e.g., 206a) responsive to detecting a reduction of frequency of access by the other users (e.g., one or more of 206b, 206c, . . . , 206n) and a reduction of posting by the user (e.g., 206a) of a content type identified as interesting to the other users (e.g., one or more of 206b, 206c, . . . , 206n). The notification may include information encouraging the user (e.g., 206a) to perform actions including posting and resharing the content of the content type.

For example, one or more hardware processors 202 may monitor social network site activities of a first user (e.g., 206a) on a social network site. One or more of the hardware processors 202 may identify a second user of the social network site (e.g., one or more of 206b, 206c, . . . , 206n) whose postings the first user follows. One or more of the hardware processors 202 may classify the second user's (e.g., one or more of 206b, 206c, . . . , 206n) postings that the first user (e.g., 206a) follows into a content type. One or more of the hardware processors 202 may store in a storage device 208 coupled to one or more of the hardware processors 202, the content type indexed by a pair of identifiers identifying the first user and the second user. One or more of the hardware processors 202 may send a notification to the second user (e.g., one or more of 206b, 206c, . . . , 206n) via a communication network 204 requesting the second user to post content of the content type to promote social network site interactions or activities of the first user (e.g., 206a).

The notification one or more of the hardware processors 202 send may include one or more items of the content type and a recommendation to the second user to post the one or more items. The notification may be generated in a form of one or more of an electronic mail, a text message, and targeted posts on a social network web page associated with the second user (e.g., one or more of 206b, 206c, . . . , 206n).

In one embodiment, one or more of the hardware processors 202 may send the notification responsive to detecting that the first user's (e.g., 206a) social network site activities have decreased over a period of time and detecting that the second user's postings (e.g., one or more of 206b, 206c, . . . , 206n) associated with the content type have decreased over the period of time.

In one aspect, one or more of the hardware processors 202 may detect that the first user's (e.g., 206a) social network site activities have decreased by comparing first user's historical access patterns on the social network site with first user's access patterns over the period of time. One or more of the hardware processors 202 may perform the functions described above for each of a first user and with respect to each of one or more second users.

Figure 3:
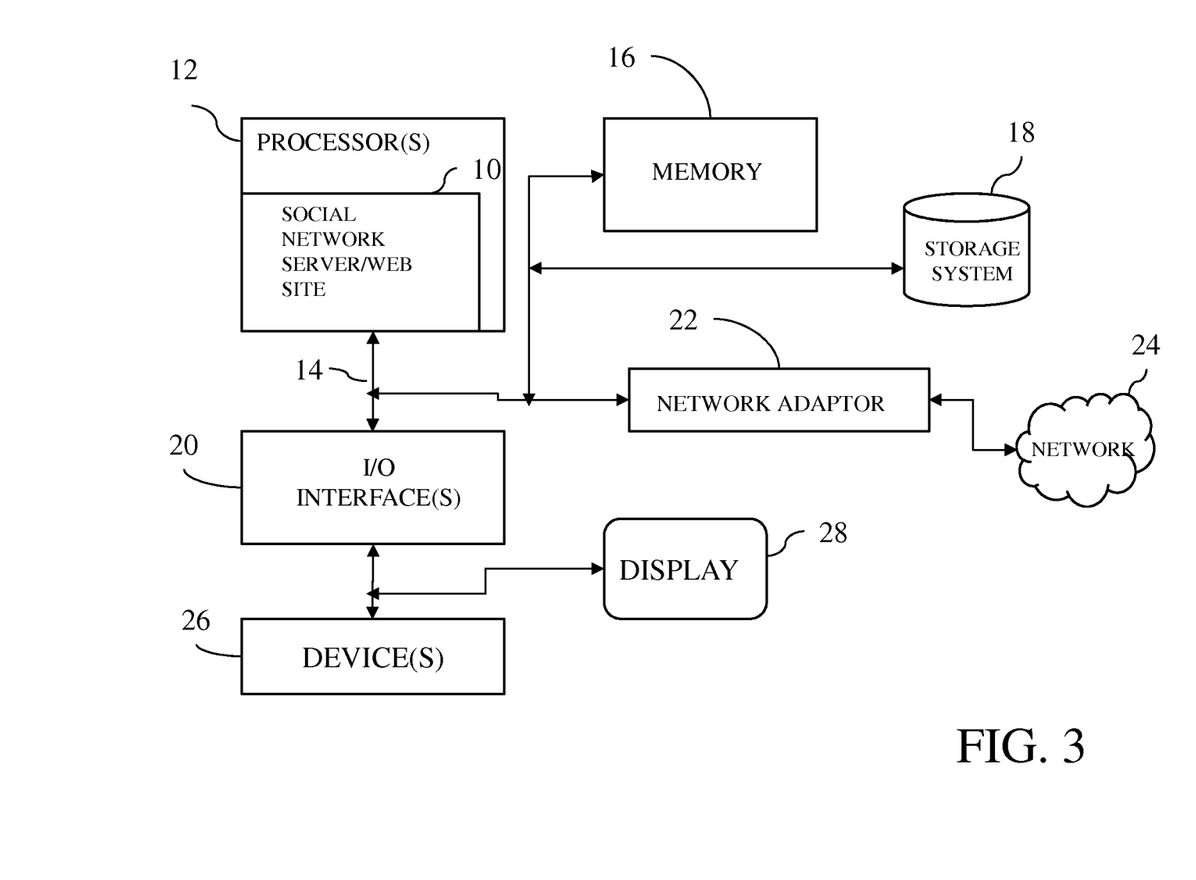
FIG. 3 illustrates a schematic of an example computer or processing system that may implement a social network engagement system in one embodiment of the present disclosure.

FIG. 3 illustrates a schematic of an example computer or processing system that may implement a social network engagement system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a social networking module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of increasing social network site interactions, the method performed by one or more hardware processors, the method comprising:

monitoring by a social network server executing on one or more of the hardware processors, social network site activities of a first user on a social network site;

based on the monitoring, identifying a second user of the social network site whose postings the first user follows;

classifying by the social network server, the second user's postings that the first user follows into a content type associated with a specific topic;

storing, by the social network server in a storage device, the content type associated with the specific topic indexed by a pair of identifiers identifying the first user and the second user;

determining that the first user's social network site activities has decreased;

determining that the second user's postings related to the content type associated with the specific topic has decreased; and sending by the social network server, a notification to the second user, the notification requesting that the second user post content of the content type associated with the specific topic, the notification promoting social network site interactions of the first user, wherein the second user is a followed user and the social network server indicates to the second user that the second user's posting of the content of the content type associated with the specific topic has increased the first user's social network site activities.

2. The method of claim 1, the notification further comprises one or more items of the content type and a recommendation to the second user to post the one or more items.

3. The method of claim 1, wherein the notification is sent responsive to detecting that the first user's social network site activities have decreased over a period of time and detecting that the second user's postings associated with the content type have decreased over the period of time.

4. The method of claim 3, wherein the detecting that the first user's social network site activities have decreased comprises comparing first user's historical access patterns on the social network site with first user's access patterns over the period of time.

5. The method of claim 1, wherein the notification comprise one or more of an electronic mail, a text message, and a targeted posts on a social network web page associated with the second user.

6. The method of claim 1, wherein the method is performed for each of a plurality of first users on the social network site.

7. The method of claim 1, wherein the method is performed with respect to each of a plurality of second users followed by the first user on the social network site.

8. A non-transitory computer readable storage medium storing a program of instructions executable by a machine to perform a method of increasing social network site interactions, the method comprising:

monitoring by a social network server executing on one or more of the hardware processors, social network site activities of a first user on a social network site;

based on the monitoring, identifying a second user of the social network site whose postings the first user follows;

classifying by the social network server, the second user's postings that the first user follows into a content type associated with a specific topic;

storing, by the social network server in a storage device, the content type associated with the specific topic indexed by a pair of identifiers identifying the first user and the second user;

determining that the first user's social network site activities has decreased;

determining that the second user's postings related to the content type associated with the specific topic has decreased; and sending by the social network server, a notification to the second user, the notification requesting that the second user post content of the content type associated with the specific topic, the notification promoting social network site interactions of the first user, wherein the second user is a followed user and the social network server indicates to the second user that the second user's posting of the content of the content type associated with the specific topic has increased the first user's social network site activities.

9. The non-transitory computer readable storage medium of claim 8, the notification further comprises one or more items of the content type and a recommendation to the second user to post the one or more items.

10. The non-transitory computer readable storage medium of claim 8, wherein the notification is sent responsive to detecting that the first user's social network site activities have decreased over a period of time and detecting that the second user's postings associated with the content type have decreased over the period of time.

11. The non-transitory computer readable storage medium of claim 10, wherein the detecting that the first user's social network site activities have decreased comprises comparing first user's historical access patterns on the social network site with first user's access patterns over the period of time.

12. The non-transitory computer readable storage medium of claim 8, wherein the notification comprise one or more of an electronic mail, a text message, and a targeted posts on a social network web page associated with the second user.

13. The non-transitory computer readable storage medium of claim 8, wherein the method is performed for each of a plurality of first users on the social network site.

14. The non-transitory computer readable storage medium of claim 8, wherein the method is performed with respect to each of a plurality of second users followed by the first user on the social network site.

15. A system of increasing social network site interactions, comprising:

one or more hardware processors running a social network server operable to monitor social network site activities of a first user on a social network site, one or more of the hardware processors further operable to identify a second user of the social network site whose postings the first user follows, one or more of the hardware processors further operable to classify the second user's postings that the first user follows into a content type associated with a specific topic;

a storage device couple to one or more of the hardware processors;

one or more of the hardware processors further operable to store in the storage device, the content type associated with the specific topic indexed by a pair of identifiers identifying the first user and the second user, one or more of the hardware processors further operable to determine that the first user's social network site activities has decreased, one or more of the hardware processors further operable to determine that the second user's postings related to the content type associated with the specific topic has decreased, one or more of the hardware processors further operable to send a notification to the second user via a communication network requesting that the second user post content of the content type associated with the specific topic, the notification promoting social network site interactions of the first user, wherein the second user is a followed user and the social network server indicates to the second user that the second user's posting of the content of the content type associated with the specific topic has increased the first user's social network site activities.

16. The system of claim 15, wherein the notification further comprises one or more items of the content type and a recommendation to the second user to post the one or more items.

17. The system of claim 15, wherein the notification is sent responsive to detecting that the first user's social network site activities have decreased over a period of time and detecting that the second user's postings associated with the content type have decreased over the period of time.

18. The system of claim 17, wherein one or more of the hardware processors detects that the first user's social network site activities have decreased by comparing first user's historical access patterns on the social network site with first user's access patterns over the period of time.

19. The system of claim 15, wherein the notification comprise one or more of an electronic mail, a text message, and a targeted posts on a social network web page associated with the second user.

20. The system of claim 15, wherein one or more of the hardware processors notifies the first user that the second user posted additional content of the content type.

* * * * *